US008626800B2

(12) United States Patent
Carbajales et al.

(10) Patent No.: US 8,626,800 B2
(45) Date of Patent: Jan. 7, 2014

(54) SYNCHRONIZATION OF ARTIFACTS ACROSS DIFFERENT DOMAINS

(75) Inventors: Sebastian Carbajales, Toronto (CA); Tak Seng Chau, Markham (CA); Vladimir Klicnik, Oshawa (CA); Raymond L. Kong, Markham (CA); Lok T. Loi, Toronto (CA); Alina Y. Rotarescu, Newmarket (CA); Xiaobin Zhang, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1176 days.

(21) Appl. No.: 12/331,017

(22) Filed: Dec. 9, 2008

(65) Prior Publication Data
US 2010/0145907 A1 Jun. 10, 2010

(51) Int. Cl.
*G06F 17/30* (2006.01)
(52) U.S. Cl.
USPC .......................................... 707/803; 707/810
(58) Field of Classification Search
None
See application file for complete search history.

(56) References Cited

U.S. PATENT DOCUMENTS

2005/0050068 A1* 3/2005 Vaschillo et al. ............. 707/100
2006/0026251 A1 2/2006 Cheng et al.

OTHER PUBLICATIONS

Bin Zhou "Build strong, flexible J2EE apps with a WebShpere cluster environment" found at http://www-128.ibm.com/developerworks/websphere/library/techarticles/0606_zhou.html on Aug. 14, 2008.
IBM Software Group "WebSphere Business Modeler V6.1" found at http://publib.boulder.ibm.com/infocenter/ieduasst/v1r1m0/topic/com.ibm.iea.wpi_v6/wbmodeler/6.1/Overview/WBIV61_WBModelerUpdate_Iterative.pdf, (2008).
Laura Olson Synchronize UDDI registries with WebSphere Service Registry and Repository for better SOA governance found at http:www/ibm.com/developerworks/websphere/library/techarticles/0802_olson/0802_olson.html on Aug. 14, 2008.
Shiwa S. Fu, Jeaha Yang, Jim Laredo, Ying Huang, Henry Chang, Santhosh Kumaran, and Jen-Yao Chung; "Solution Templates Tool for Enterprise Business Applications Integration", Sensor Networks, Ubiquitous and Trustworthy Computing, 2008. SUTC '08 IEEE International Conference on Date: Jun. 11-13, 2008, pp. 314-319 Digital Object Identifier 10-1109/SUTC.2008.84.

* cited by examiner

*Primary Examiner* — Syed Hasan
(74) *Attorney, Agent, or Firm* — Cantor Colburn LLP; Rahan Uddin

(57) ABSTRACT

A method of synchronizing artifacts of a first domain with artifacts of a second domain is provided. The method includes: loading a first set of transformed artifacts and a first artifact map from a first domain into a second domain; generating an association model based on an evaluation of the first artifact map and a second artifact map; comparing a first transformed artifact of the first set of transformed artifacts with a second artifact of a second set of artifacts corresponding to the second artifact map based on the association model; determining differences based on the comparing; and selectively updating the second artifact map based on the differences.

6 Claims, 5 Drawing Sheets

SYNCHRONIZATION OF ARTIFACTS ACROSS DIFFERENT DOMAINS

BACKGROUND

The present disclosure relates to methods, systems, and computer program products for synchronizing artifacts across two or more domains.

Cross-domain iterative development, where artifacts developed in a first domain are imported into a second domain and developed in parallel with the artifacts in the first domain, allows for development to occur at varying levels. For example, a business analyst may develop a higher level application in a first domain (e.g., WebSphere Business Modeler (WBM)). At some point, the analyst exports the application and generates runtime artifacts which are then imported by an IT specialist/developer into a second domain (e.g., WebSphere Integration Developer (WID)). The artifacts are then edited in the second domain at a lower level.

However, it is often the case that, in the mean time, the business analyst continues developing the high lever application in WBM. At some point, the business analyst decides to export a new version of the application. However, when the IT specialist/developer attempts to re-import the new version, the newly generated artifacts do not synchronize with the artifacts in WID. Provided that changes were made in parallel in both applications, there is no easy way to associate new and existing artifacts especially if the newly generated artifacts are drastically different from the original version.

SUMMARY

According to one embodiment of the present invention a method of synchronizing artifacts of a first domain with artifacts of a second domain is provided. The method includes: loading a first set of transformed artifacts and a first artifact map from a first domain into a second domain; generating an association model based on an evaluation of the first artifact map and a second artifact map; comparing a first transformed artifact of the first set of transformed artifacts with a second artifact of a second set of artifacts corresponding to the second artifact map based on the association model; determining differences based on the comparing; and selectively updating the second artifact map based on the differences.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The drawings described herein are for illustration purposes only and are not intended to limit the scope of the present disclosure in any way. It should be understood that throughout the drawings, corresponding reference numerals indicate like or corresponding parts and features.

DETAILED DESCRIPTION

Figure 1:
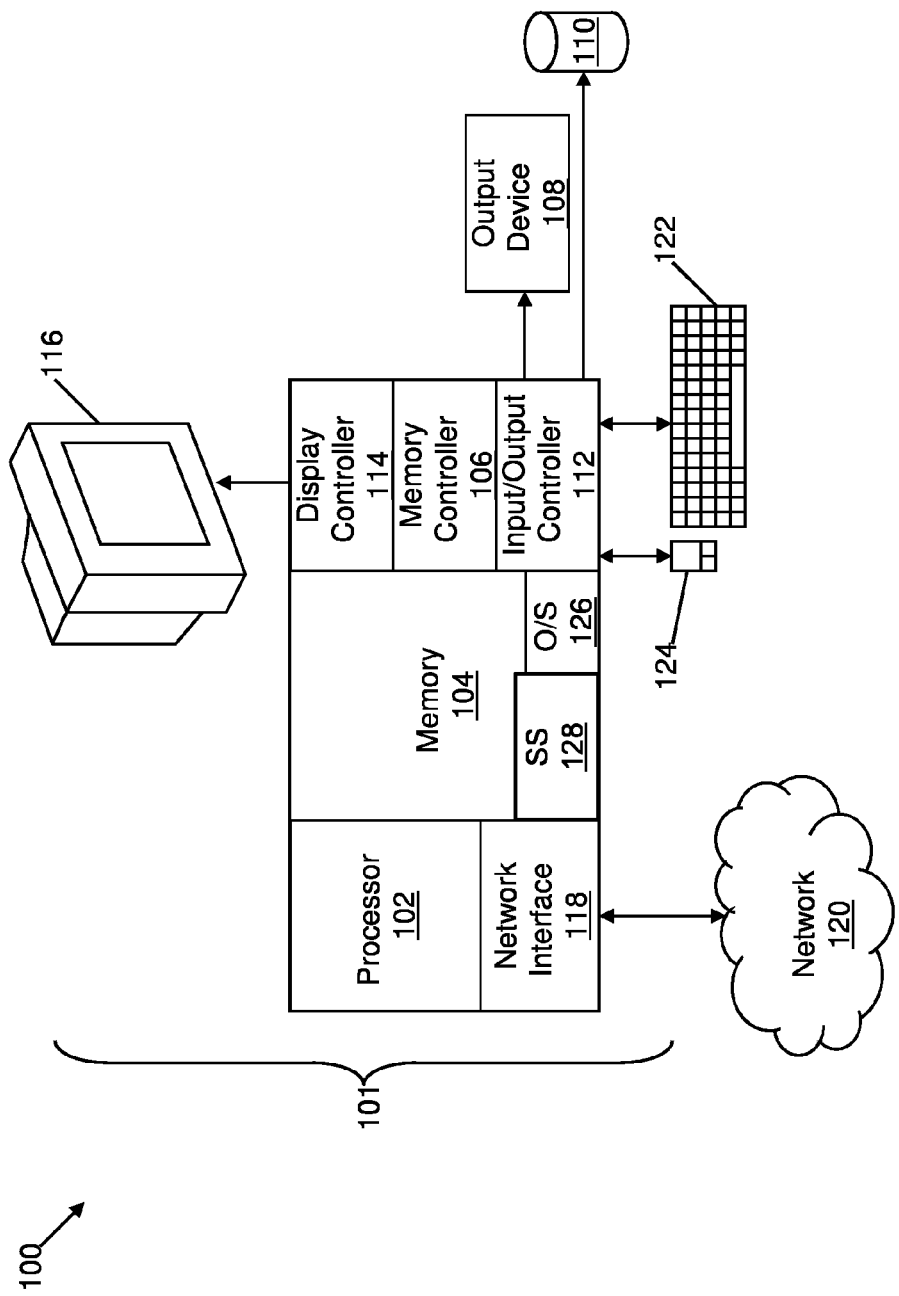
FIG. 1 is a functional block diagram of a computing system that includes a synchronization system in accordance with an exemplary embodiment.

Turning now to the drawings in greater detail, it will be seen that in FIG. 1 an exemplary computing system includes a synchronization system in accordance with the present disclosure. The computing system 100 is shown to include a computer 101. As can be appreciated, the computing system 100 can include any computing device, including but not limited to, a desktop computer, a laptop, a server, a portable handheld device, or any other electronic device. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, a conventional keyboard 122 and mouse 124 can be coupled to the input/output controller 112. In an exemplary embodiment, the computing system 100 can further include a network interface 118 for coupling to a network 120. The network 120 transmits and receives data between the computer 101 and external systems.

In various embodiments, the memory 104 stores instructions that can be executed by the processor 102. The instructions stored in memory 104 may include one or more separate programs, each of which comprises an ordered listing of executable instructions for implementing logical functions. In the example of FIG. 1, the instructions stored in the memory 104 include a suitable operating system (OS) 126. The operating system 126 essentially controls the execution of other computer programs and provides scheduling, input-output control, file and data management, memory management, and communication control and related services.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The processor 102 executes the instructions of a synchronization system 128 of the present disclosure. In various embodiments, the synchronization system 128 of the present disclosure is stored in the memory 104 (as shown), is executed from a portable storage device (e.g., CD-ROM, Diskette, FlashDrive, etc.) (not shown), and/or is run from a remote location, such as from a central server (not shown).

Generally speaking, the synchronization system 128 employs a traceability mechanism that maintains cross-domain relationships between artifacts from two or more different domains. Using the traceability mechanism, the synchronization system 128 compares the artifacts from the two or more different domains and updates the artifacts in each domain such that they are synchronized.

In one example, the first domain is a high-level developer application, such as, WebSphere Business Modeler (WBM), and the second domain is a lower-level developer application, such as, WebSphere Integration Developer (WID). As can be appreciated, the domains can be any artifact generating domain and are not limited to the present example.

Figure 2:
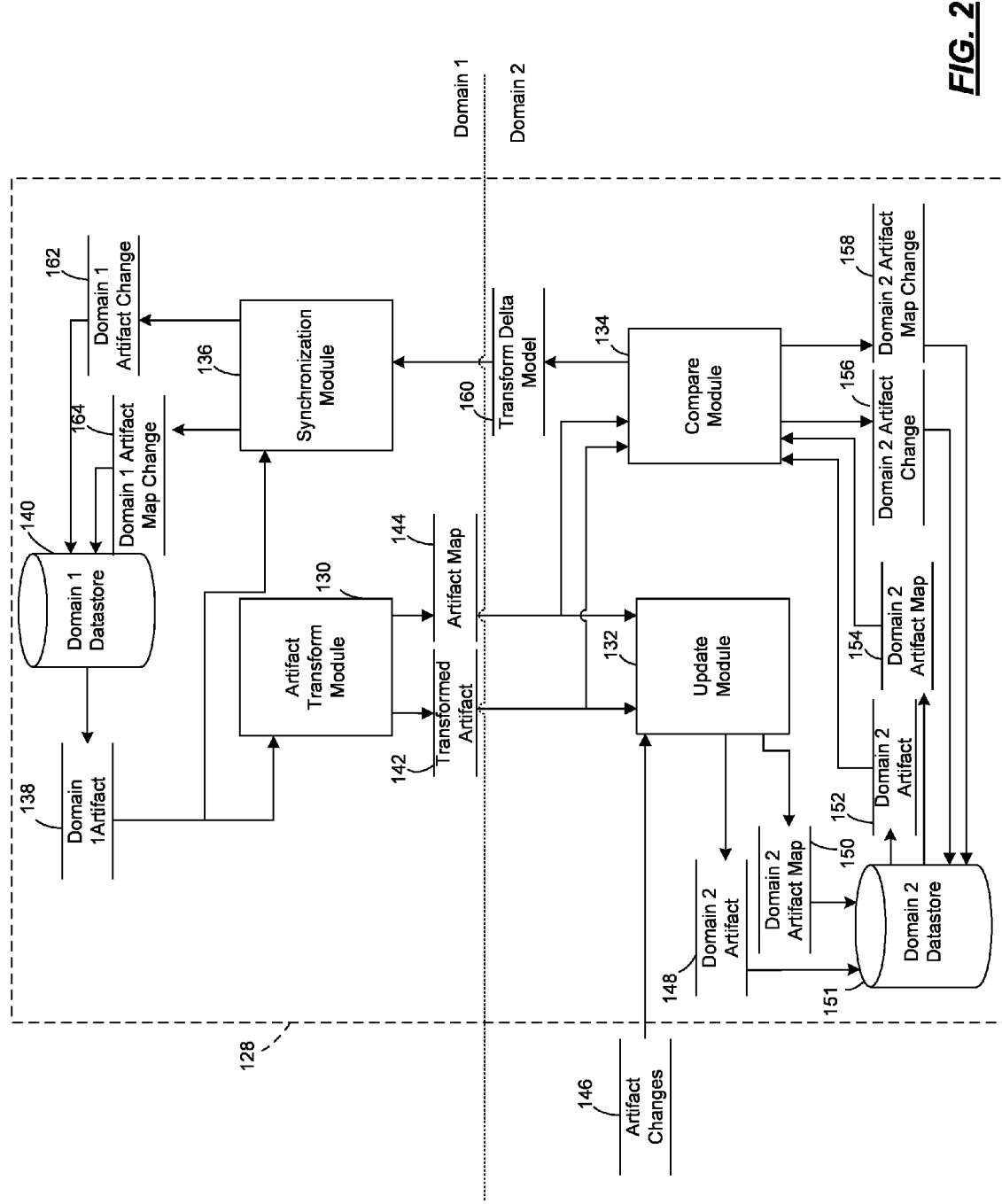
FIG. 2 is dataflow diagram of the synchronization system of FIG. 1 in accordance with an exemplary embodiment.

Turning now to FIG. 2, the synchronization system 128 is shown in more detail in accordance with an exemplary embodiment. The synchronization system 128 includes one or more sub-modules and datastores. As can be appreciated, the sub-modules can be implemented as software, hardware, firmware and/or other suitable components that provide the described functionality. As can be appreciated, the sub-modules shown in FIG. 2 can be combined and/or further partitioned to similarly synchronize artifacts from different domains. In this example, the synchronization system includes an artifact transform module 130, an update module 132, a compare module 134, and a synchronization module 136.

The artifact transform module 130 receives as input one or more artifacts 138 from the first domain. In one example, the artifacts 138 are retrieved from a datastore 140 of the first domain. The artifact transform module 130 transforms a representation of the artifacts 138 generated by the first domain to a representation that is compatible with the second domain (hereinafter referred to as a transformed artifacts 142). Based on the transformation, the artifact transform module 130 generates an artifact map 144. The artifact map 144 captures traceability information between the first domain artifact and the transformed artifact 142 of the second domain.

Figure 3:
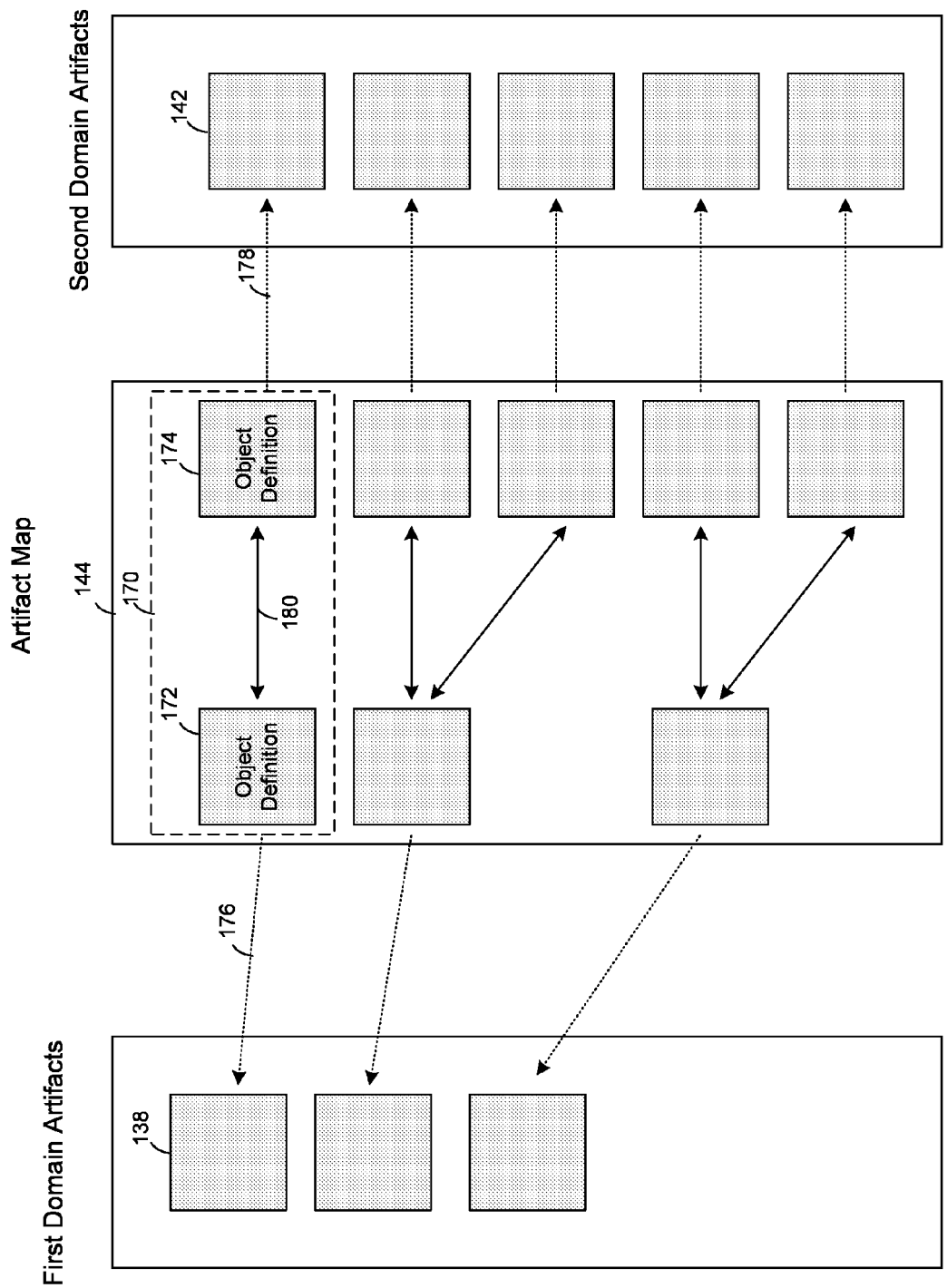
FIG. 3 is a functional block diagram illustrating an artifact map of the synchronization system of FIG. 2 in accordance with an exemplary embodiment.

As shown in FIG. 3, the artifact map 144 includes pairs 170 of object definition elements 172, 174. The pairs 170 include a first domain object definition element 172 and a second domain object definition element 174. Each domain object definition element 172, 174 includes a unique identifier (UID), a reference 176, 178 to a corresponding artifact of a domain and one or more descriptors of the corresponding artifact. The unique identifier is unique for each artifact and can be preserved through several transformations of the same artifact. The unique identifier can be used to develop associations between object definitions 174 of pairs 170 of different artifact maps 154 (as will be discussed in more detail with regard to FIG. 4). In various embodiments, the descriptors can include, but are not limited to, a definition, an artifact value, a timestamp, a location or relationship to the first domain output (such as, for example, a document location).

The first domain object definition element 172 includes a reference 176 to a corresponding artifact 138 of the first domain. The second domain object definition element 174 includes a reference 178 to the corresponding transformed artifact 142 of the second domain.

With reference back to FIG. 2, in one example, the functions of the artifact transform module 130 can be called on demand and/or scheduled to execute based on predetermined events.

The update module 132 receives as input the transformed artifact 142, the artifact map 144, and artifact changes 146. The artifact changes 146 can be generated based on modifications to the transformed artifacts 142 by, for example, a user in the second domain. The update module 132 imports the transformed artifact 142 and the artifact map 144 into a domain two datastore 151. Based on the artifact changes 146, the update module 132 updates the artifacts 148 and the artifact maps 150 stored in the domain two datastore 151.

The compare module 134 receives as input the transformed artifacts 142 and the transformed artifact map 144 that are generated, for example, from a subsequent execution of the functions of the artifact transform module 130, and artifacts 152 and an artifact map 154 from the domain two datastore 151. The compare module 134 develops an association model 400 (FIG. 4) based on the transformed artifacts maps 144 and the artifact maps 154 from the domain two datastore 151. The association model 400 (FIG. 4) maintains a relationship between the different artifacts 152 and 142 by using the information in the artifact maps 144 and 154.

Figure 4:
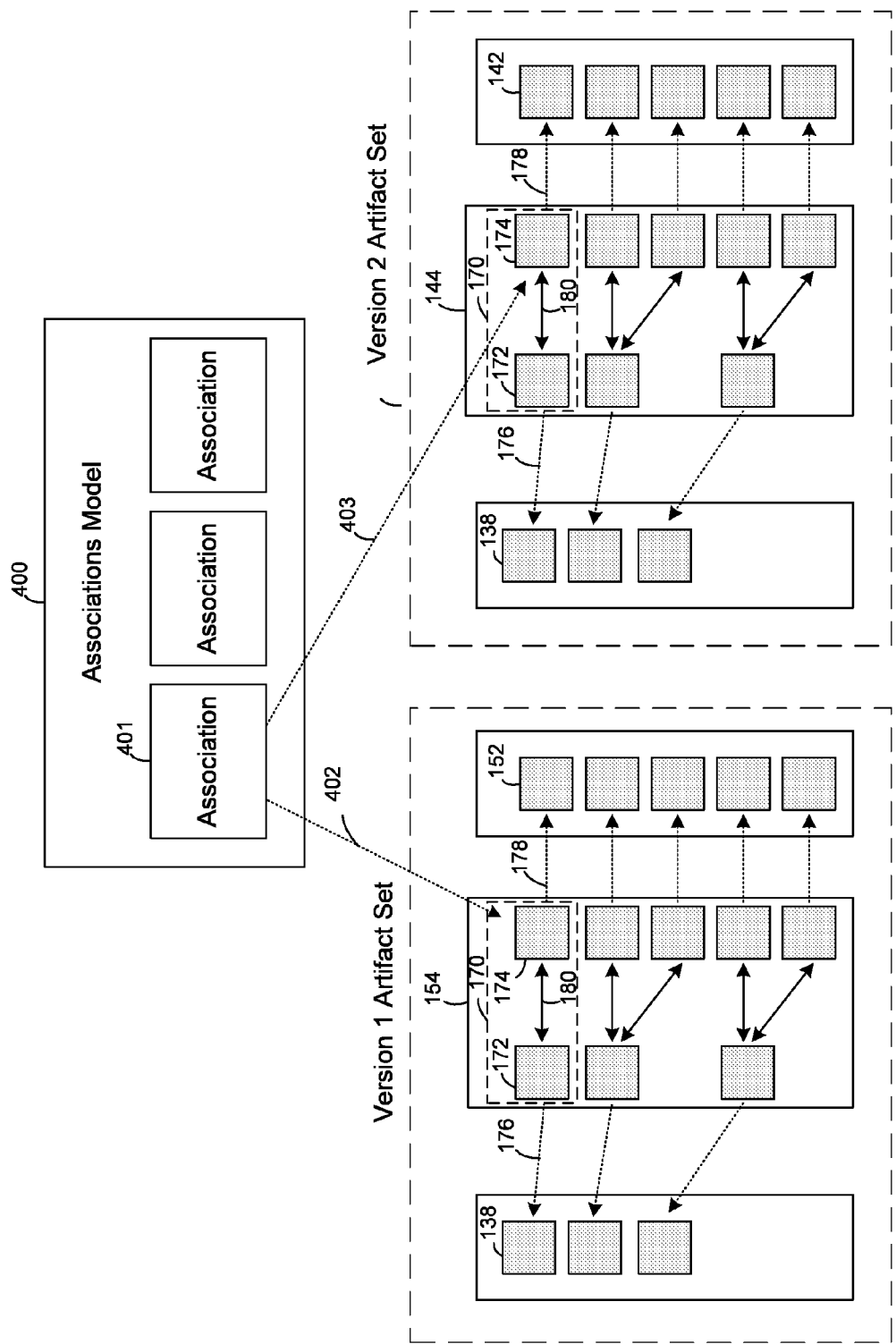
FIG. 4 is a functional block diagram illustrating an associations model of the synchronization system of FIG. 2 in accordance with an exemplary embodiment.

With reference to FIG. 4 and continued reference to FIG. 3, in one example, to build the association model 400, the compare module 134 evaluates each map 144, 154 sequentially. Based on the evaluation, the compare module 134 creates, for each new unique identifier found in an object definition 174, a new association object 401 in the associations model 400. The association object includes a reference 402, 403 to one or more objects definitions 174. The objects definitions 174 are considered to be associated with each other and can include: a new object, a current object, a merged object, an ancestor object. The compare module 134 then updates the new association object 401 for any new artifact with an already processed unique identifier. In various embodiments, the lifespan of the association model 400 is that of a single compare session between the version one artifact set and the version two artifact set.

Once the association model 400 is complete, the compare module 134 uses the association model 400 to compare the associated artifacts 142, 152 and determines any differences. The differences are determined in terms of the second domain and expressed in a transform delta model 160.

In one example, the transform delta model 160 is created when the user has committed any changes to the domain two artifacts 152 based on the differences. The transform delta model 160 captures changes that were not accepted by the user thus, representing outstanding differences to be reported to the first domain.

The transform delta model 160 includes delta objects that reference the object definition elements from the map 144, 154. One transform delta model 160 is created for each difference left uncommitted between the first and the second domain, or committed by the second domain, by the compare module 134.

The synchronization module 136 receives as input artifacts 138 or the first domain, and the transform delta model 160. The synchronization module 136 interprets the transform delta model 160 and determines which changes in the first domain affected the existing objects in the second domain. Based on the changes, the synchronization module 136 optionally updates the artifacts 138 of the first domain with the changes.

Figure 5:
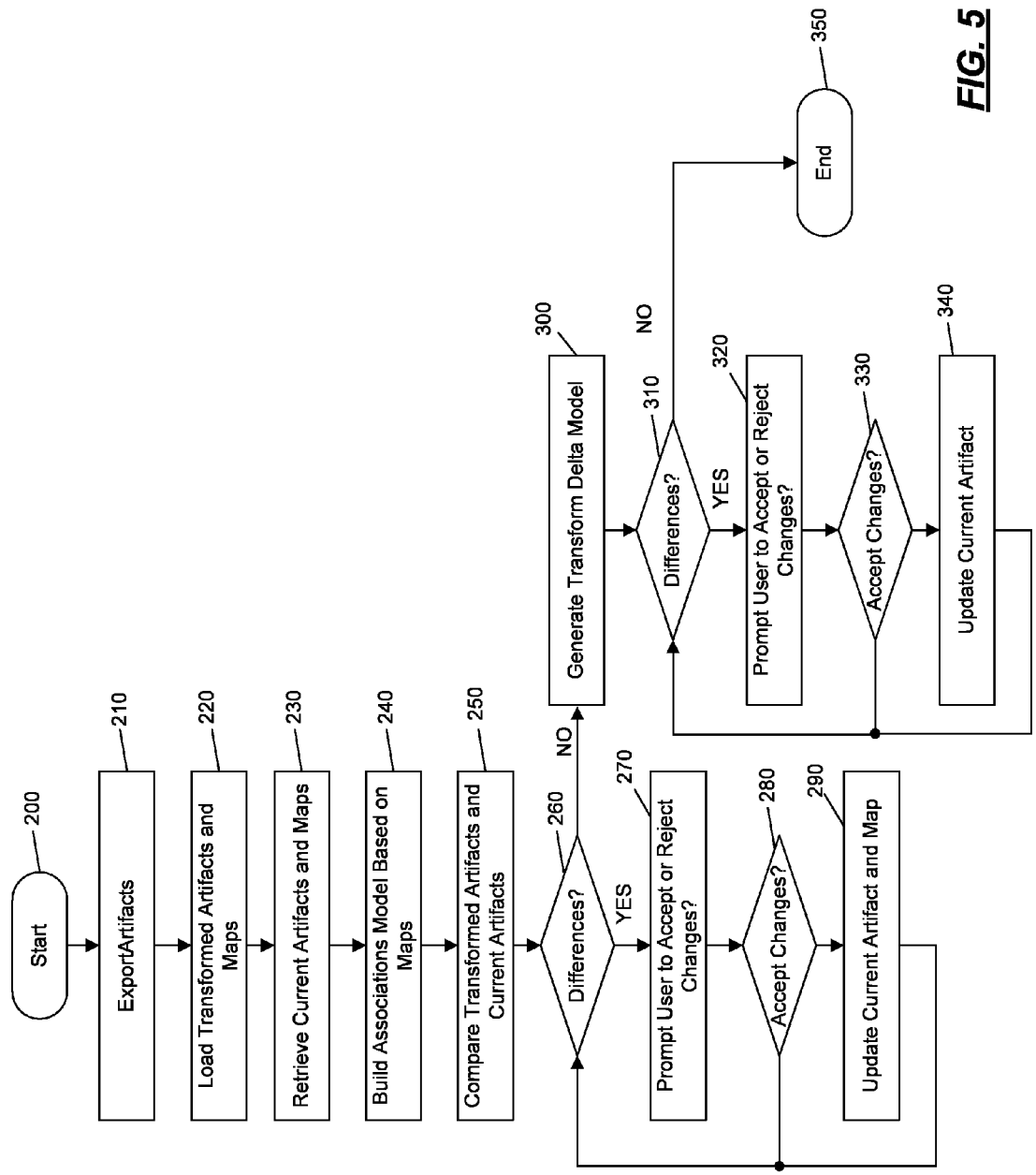
FIG. 5 is flowchart illustrating a synchronization method that can be performed by the synchronization system of FIG. 2 in accordance with an exemplary embodiment.

Turning now to FIG. 5, a flow chart illustrates a synchronization method that can be performed by the synchronization system of FIG. 2 in accordance with an exemplary embodiment. As can be appreciated in light of the disclosure, the order of operation within the method is not limited to the sequential execution as illustrated in FIG. 5, but may be performed in one or more varying orders as applicable and in accordance with the present disclosure.

In one example, the method may begin at 200. The artifacts from a latest version residing in the first domain are exported from the first domain at process block 210. The export generates a set of transformed artifacts and artifact maps. The transformed artifacts and the artifact maps are then loaded into the second domain at process block 220. The current artifacts and corresponding current maps are retrieved in the second domain at process block 230. Based on the current artifact maps and the transformed artifact maps, the association model is built at process block 240.

Upon completion of the association model at process block 240, the transformed artifacts and the associated current artifacts are compared at process block 250 for differences. When a difference is found at process block 260, a prompt may optionally be generated for allowing a user to accept or reject the changes at process block 270. When the changes are accepted at process block 280, the corresponding current artifact and artifact map are updated at process block 290. The process continues until all differences have been reviewed at process block 260.

Upon completion of evaluating all differences at process block 260, the transform delta model is generated at process block 300 based on the differences. In one example, the transform delta model is generated based on the accepted changes, the rejected changes, or when changes were based on changes from the second domain rather than the first domain. When the differences are only as a result of changes from the first domain and all changes are consolidated, the transform delta model can optionally not be generated at 300.

Once the transform delta model is generated at process block 300, the differences depicted by the transform delta mode are evaluated at process block 310. When the transform delta model depicts a difference at process block 310, a prompt may optionally be generated for allowing a user to accept or reject the changes in the first domain at process block 320. When the changes are accepted at process block 330, the corresponding current artifact in the first domain is updated at process block 340. The process continues until all differences provided in the transform delta model have been reviewed at process block 310. Thereafter, the method may end at 350.

As will be appreciated by one skilled in the art, the present invention may be embodied as a system, method or computer program product. Accordingly, the present invention may take the form of an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a transmission media such as those supporting the Internet or an intranet, or a magnetic storage device. Note that the computer-useable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instruction.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of synchronizing artifacts of a first domain with artifacts of a second domain, the method comprising:
    loading a first set of transformed artifacts and a first artifact map from a first domain into a second domain, the first set of transformed artifacts based on a first artifact of a first set of artifacts, and the first set of transformed artifacts of the first domain compatible with the second domain the first artifact may capturing traceability information between artifacts in the first domain and the first set of transformed artifacts;
    generating an association model based on an evaluation of the first artifact map and a second artifact map;
    comparing a first transformed artifact of the first set of transformed artifacts with a second artifact of a second set of artifacts corresponding to the second artifact map based on the association model;
    determining differences based on the comparing;
    selectively updating the second artifact map based on the differences; and
    selectively updating the first artifact based on the differences such that the first artifact and the second artifact are synchronized with one another, the updating of the first artifact based on a traceability mechanism that maintains a cross-domain relationship between the first artifact and the second artifact.

2. The method of claim 1 further comprising generating a delta model based on the differences.

3. The method of claim 2 wherein the generating the delta model is based on differences with respect to changes in the first domain that were not accepted in the second domain.

4. The method of claim 2 wherein the generating the delta model is further based on differences with respect to changes in the second domain.

5. The method of claim 2 further comprising loading the delta model into the first domain and updating a first set of non-transformed objects associated with the first set of transformed objects based on the delta model.

6. The method of claim 1 further comprising:
    generating a unique identifier for each transformed artifact; and
    storing the unique identifier in the artifact map, and
    wherein the generating the association model is based on the unique identifier stored in the artifact map.

* * * * *